United States Patent [19]

Park

[11] Patent Number: 4,770,527

[45] Date of Patent: Sep. 13, 1988

[54] PHOTOELECTRIC-PIEZOELECTRIC VELOCITY AND IMPACT SENSOR

[75] Inventor: Kyung T. Park, Upper Darby, Pa.

[73] Assignee: Pennwalt Corporation, Philadelphia, Pa.

[21] Appl. No.: 10,025

[22] Filed: Feb. 2, 1987

[51] Int. Cl.⁴ .......................... G01P 3/36; A63B 69/36
[52] U.S. Cl. ......................................... 356/28; 73/379; 250/222.1; 273/181 H; 273/182 R; 273/184 R; 273/185 R; 273/26 A
[58] Field of Search ...................... 73/379; 250/222.1; 356/28; 273/181 H, 182 R, 184 R, 185 R, 26 R, 26 A

[56] References Cited

U.S. PATENT DOCUMENTS

| | | | |
|---|---|---|---|
| 2,157,572 | 5/1939 | Roberts | 161/13 |
| 2,626,312 | 1/1953 | Clark et al. | 175/381 |
| 3,025,406 | 3/1962 | Stewart et al. | 250/220 |
| 3,229,975 | 1/1966 | Tompkins et al. | 273/26 A |
| 3,727,069 | 4/1973 | Crittenden, Jr. et al. | 250/222 R |
| 3,792,354 | 2/1974 | Slaght et al. | 324/178 |
| 3,814,438 | 6/1974 | Baron et al. | 273/176 FA |
| 4,031,373 | 6/1977 | Beckwith | 235/151.32 |
| 4,128,761 | 12/1978 | Oehler | 250/222 R |
| 4,177,994 | 12/1979 | Lindquist | 273/176 FA |
| 4,199,141 | 4/1980 | Garcia | 273/26 A |
| 4,343,469 | 8/1982 | Kunita et al. | 273/181 G |
| 4,563,005 | 1/1986 | Hand et al. | 273/26 R |
| 4,659,090 | 4/1987 | Kustanovich | 273/26 A |
| 4,672,195 | 6/1987 | Golborne et al. | 250/222.1 |

Primary Examiner—Stephen C. Buczinski
Attorney, Agent, or Firm—Seidel, Gonda, Goldhammer & Abbott

[57] ABSTRACT

A photoelectric-piezoelectric velocity and impact sensor has a plurality of photoelectric light sources and associated photodetectors disposed on axes defining an array of light beams. A first electronic circuit is operatively coupled to the photodetectors for generating a signal representative of the moment in time when at least one light beam of the array is broken by a projectile passing through the array. A substantially planar transducer is disposed coplanar with and spaced apart from the array for generating a signal when the projectile strikes the transducer after passing through the array. A second electronic circuit responsive to the signal from the transducer is provided for generating a signal representative of the moment in time when the projectile strikes the transducer. A calculating circuit responsive to the signal from the first circuit and the signal from the second circuit is provided for calculating the velocity of the projectile as a function of the time difference between the signals. The transducer may be divided into a plurality of distinct independent zones, each adapted to generate a signal only when struck by the projectile. If the transducer is divided into zones, a third electronic circuit is provided for generating a signal representative of the zone struck by the projectile.

31 Claims, 2 Drawing Sheets

PHOTOELECTRIC-PIEZOELECTRIC VELOCITY AND IMPACT SENSOR

FIELD OF THE INVENTION

The present inventions relates to measurement of the velocity and point of impact of a projectile, such as a baseball or other object thrown or otherwise impelled by a player.

BACKGROUND OF THE INVENTION

Devices for measuring velocity and other kinematic parameters of a projectile using optical techniques are known. For example, U.S. Pat. No. 3,025,406 discloses a light screen which utilizes a pair of opposed mirrors which cause a light beam to make a zig-zag path across the screen. The apparatus disclosed in this patent is useful for detecting ballistic objects of small circumferential diameter that would otherwise pass through a monitoring area undetected.

U.S. Pat. No. 3,727,069 discloses an apparatus for measuring the velocity, size and location of a projectile, and includes vertical and horizontal arrays of light beams for indicating location and diameter of a projectile passing through a target frame. Two adjacent beam arrays are provided for measuring projectile velocity as a function of the time it takes for the projectile to pass through both arrays.

U.S. Pat. No. 4,128,761 discloses a ballistic velocity measuring instrument wherein a projectile passes through a first frame having photoresponsive devices and through a second frame also having photoresponsive devices to thereby provide a time-travel reference for a logarithmic diode circuit to compute projectile velocity.

Devices for measuring velocity and kinematic parameters of projectiles used in games such as baseball and golf are also known. For example, U.S. Pat. No. 4,177,994 discloses a golf practice device consisting of a grid of parallel, horizontal and vertical conductor wires which, when hit by a golf ball, cause a grid point contact between a vertical and horizontal wire. A light sensor determines when the golf ball is struck and starts a timing mechanism. The wire mesh detects both the position of the golf ball and stops the timing mechanism. Thus, when the golf ball strikes the grid, information is provided to permit calculation of the speed and position, and thus path of travel, of the travelling ball.

U.S. Pat. No. 4,199,141 discloses a baseball pitching scoring apparatus comprising a strike zone having surrounding ball zones. The zones include mechanical impact sensors or switches which provide a signal to a display means when hit by a ball. However, velocity of a ball cannot be determined by the disclosed apparatus.

U.S. Pat. No. 4,563,005 discloses a baseball pitching evaluation device comprising opposed infrared emitters and receivers which provide diagonal scanning rays or light pulses across a target zone to signal a computer which calculates the coordinates of a baseball crossing the target zone. As with U.S. Pat. No. 4,199,141, velocity of the baseball cannot be determined by the disclosed apparatus.

The known types of apparatus briefly discussed above have certain disadvantages. Systems using multiple parallel optical grids, while capable of measuring velocity, are expensive to construct, consume large amounts of electrical power, can be unreliable and may be unacceptably sensitive to variations and shadows in ambient lighting. Systems employing wire grids are mechanically complex, susceptible to damage from projectile impact and may not offer an acceptable compromise between accuracy, reliability and cost.

There is therefore a need for a device which can measure projectile velocity and impact which is inexpensive to construct, offers low power consumption, and has high reliability. The present invention fulfills that need.

SUMMARY OF THE INVENTION

The present invention includes an apparatus for determining the velocity of a projectile, and comprises optical means for generating a planar array of light beams. A circuit means is operatively associated with the optical means for detecting when the projectile passes through the array and for generating a signal representative of the moment in time the projectile passes through the array. A transducer means is spaced apart from the array for generating a signal representative of the moment in time when the projectile strikes the transducer means. A calculating means is provided responsive to the signal from the first circuit means and the signal from the transducer means for calculating the velocity of the projectile from the signals.

The apparatus may further comprise display means operatively coupled to the calculating means for providing a visual display of the velocity of the projectile.

The transducer means may be divided into a plurality of distinct independent zones, each zone being adapted to generate a signal only when struck by the projectile. With this embodiment, third circuit means are provided for generating a signal representative of the zone struck by the projectile. This embodiment may further comprise display means operatively coupled to the calculating means and third circuit means for providing a visual display of the velocity of the projectile and the zone struck by the projectile.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
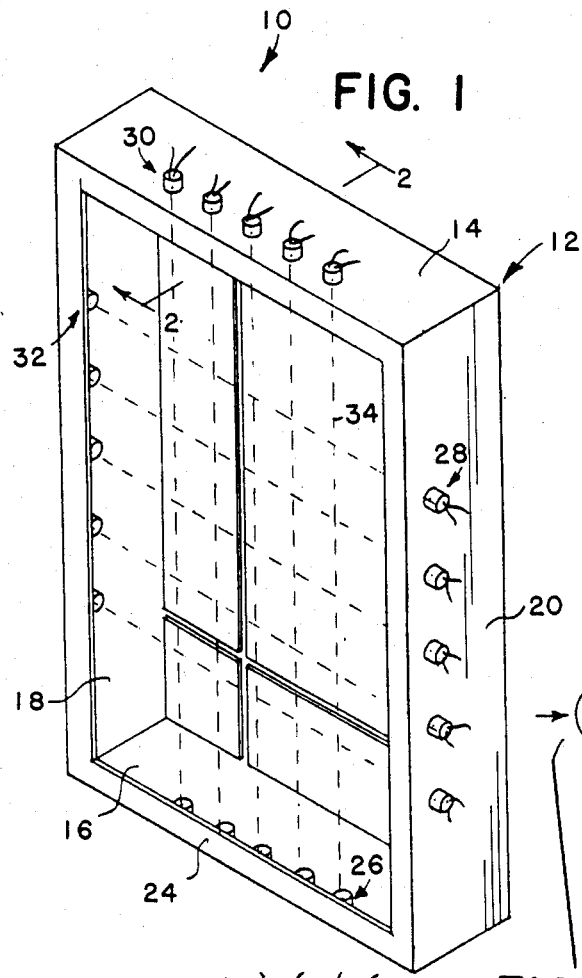
FIG. 1 is an isometric view of apparatus according to one embodiment of the invention.
Figure 2:
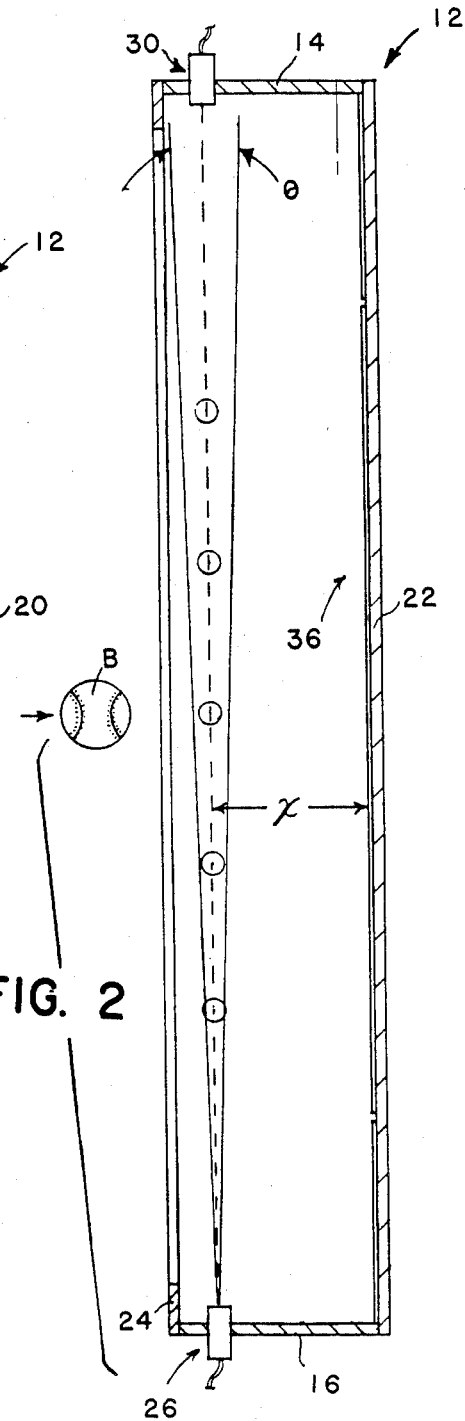
FIG. 2 is a sectional view of the apparatus of FIG. 1 taken along the lines 2—2 in FIG. 1.

Referring now to the drawings, wherein like numerals indicate like elements, there is shown in FIG. 1 apparatus 10 according to one embodiment of the invention. Apparatus 10 comprises a generally rectangular box or frame 12 which comprises top and bottom walls 14 and 16, side walls 18 and 20, and back wall 22 (best seen in FIG. 2). Frame 12 also comprises a front wall 24 which defines a generally rectangular opening (not numbered) into the interior of frame 12. Frame 12 may be constructed of suitable materials such as wood, metal, fabric or plastic, e.g., polycarbonate.

A plurality of photoelectric light sources 26 and 28 are arranged in linear fashion on bottom wall 16 and side wall 20, respectively. An equal plurality of photoelectric detectors 30 and 32 are arranged in linear fashion on top wall 14 and side wall 18, respectively, and are arranged in one-to-one correspondence with light sources 26 and 28. Each of light sources 26 and 28 and detectors 30 and 32 are aligned on a common axis, and the axes of light sources 26 and detectors 30 and the axes of light sources 28 and detectors 32 are arranged in a substantially mutually orthogonal disposition. As those skilled in the art will readily appreciate, this arrangement establishes a planar grid 34 of substantially mutually orthogonal light beams (shown in dashed lines in FIG. 1).

Of course, although a grid of light beams is illustrated in the drawings, the invention is not limited to a grid of orthogonal light beams. The invention includes an array, of parallel light beams, for example, which can be achieved using only light sources 26 and detectors 30, or sources 28 and 32. Any planar configuration or spatial relationship of light beams is included within the invention, as long as the array of light beams is arranged to detect passage of a projectile through the plane of the array.

The number of light sources and detectors, and the spacing between adjacent sources and adjacent detectors, can be chosen to accommodate any diameter of projectile whose velocity and impact are to be measured by apparatus 10. Although only ten pairs of light sources and associated detectors are shown in the drawings it will be understood that a sufficient number of light sources and detectors must be provided so that a projectile must always break at least one light beam as it passes through grid 34. Thus, if apparatus 10 is to be used to measure the velocity and impact of a standard baseball B having a diameter just over 3 inches, the light sources and detectors should be spaced so that the light beams comprising grid 34 are spaced less than 2 inches apart, so that a baseball B passing through grid 34 must break at least one light beam. The exact spacing of the light sources and detectors will also depend in part upon the dispersion angle, or beam angle, $\theta$ of the light sources.

Light sources 26 and 28 and detectors 30 and 32 may be adapted to operate at any suitable wavelength within the optical spectrum. Although the invention is not limited to any particular wavelength, wavelengths in the infrared region of the spectrum are preferred in order to make apparatus 10 less sensitive to variations and shadows in ambient lighting. In addition, it is preferred, though by no means necessary, to locate the vertically-oriented light detectors 30 in top wall 14 of frame 12, where they are less susceptible to stray optical signals. Detectors 30 may be mounted on either side wall 18 or 20 with the same effect.

Back wall 22 of frame 12 may be a rigid or flexible material, its principle purpose being to support force transducer 36 (described below) at a known distance from grid 34. In one embodiment, wall 22 is constructed of a tensioned fabric which has sufficient spring action or elasticity to propel a ball striking the surface of transducer 36 a substantial distance back toward the thrower.

Figure 3:
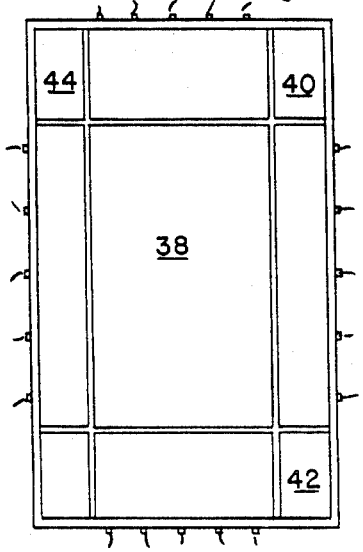
FIG. 3 is a front elevational view of the apparatus of FIG. 1.

Back wall 22 is provided with a force transducer 36 which is preferably, but not necessarily, a sheet of piezoelectric polymer material hving layers of electroconductive material on the front and back. More preferably, the transducer 36 is a resinous piezoelectric film of vinylidene fluoride homopolymer or a copolymer of vinylidene fluoride and one or more copolymerizable monomers, such film having a metallic coating deposited on the front and back surfaces and referred to hereinafter as PVDF film. Transducer 36 may be an integral sheet of PVDF film which is coextensive with and suitably adhered to the interior surface of back wall 22. However, it is preferred that force transducer 36 be divided into a plurality of separate and distinct zones in order to provide information on the zone of impact of the projectile being measured. Transducer 36 may be divided into a grid, similar to grid 34, or may be divided, as best shown in FIG. 3, into a "strike" zone 38 surrounded by a plurality of "ball" zones. The "ball" zones may be denominated, for example, as "high and outside" zone 40, "low and outside" zone 42, "high and inside" zone 44, and so forth, according to baseball parlance. Clearly, transducer 36 may be divided into any number and configuration of zones as appropriate for the projectile being measured. For example, if apparatus 10 is to be used to measure velocity and impact of a hockey puck, transducer 36 may be divided into "goal" or "no goal" zones, and the "goal" zone may be further subdivided into high/low, left/right and so forth, as appropriate.

Zone impact may also be determined by detecting which pair of mutually orthogonal light beams is broken when a grid array 36, rather than a parallel line array, is used. Suitable detection circuitry is not disclosed here, since it is within the skill in the art. In that case, it is unnecessary to divide transducer 36 into zones, and transducer 36 may simply comprise an integral structure.

As those skilled in the art will understand, force transducer 36 will generate an electrical signal when struck by the projectile. If force transducer 36 is a single, integral sheet of PVDF, only a single signal will be generated upon projectile impact. If force transducer 36 is divided into plurality of zones, each zone will generate a signal upon projectile impact independent of adjacent zones.

Figure 4:
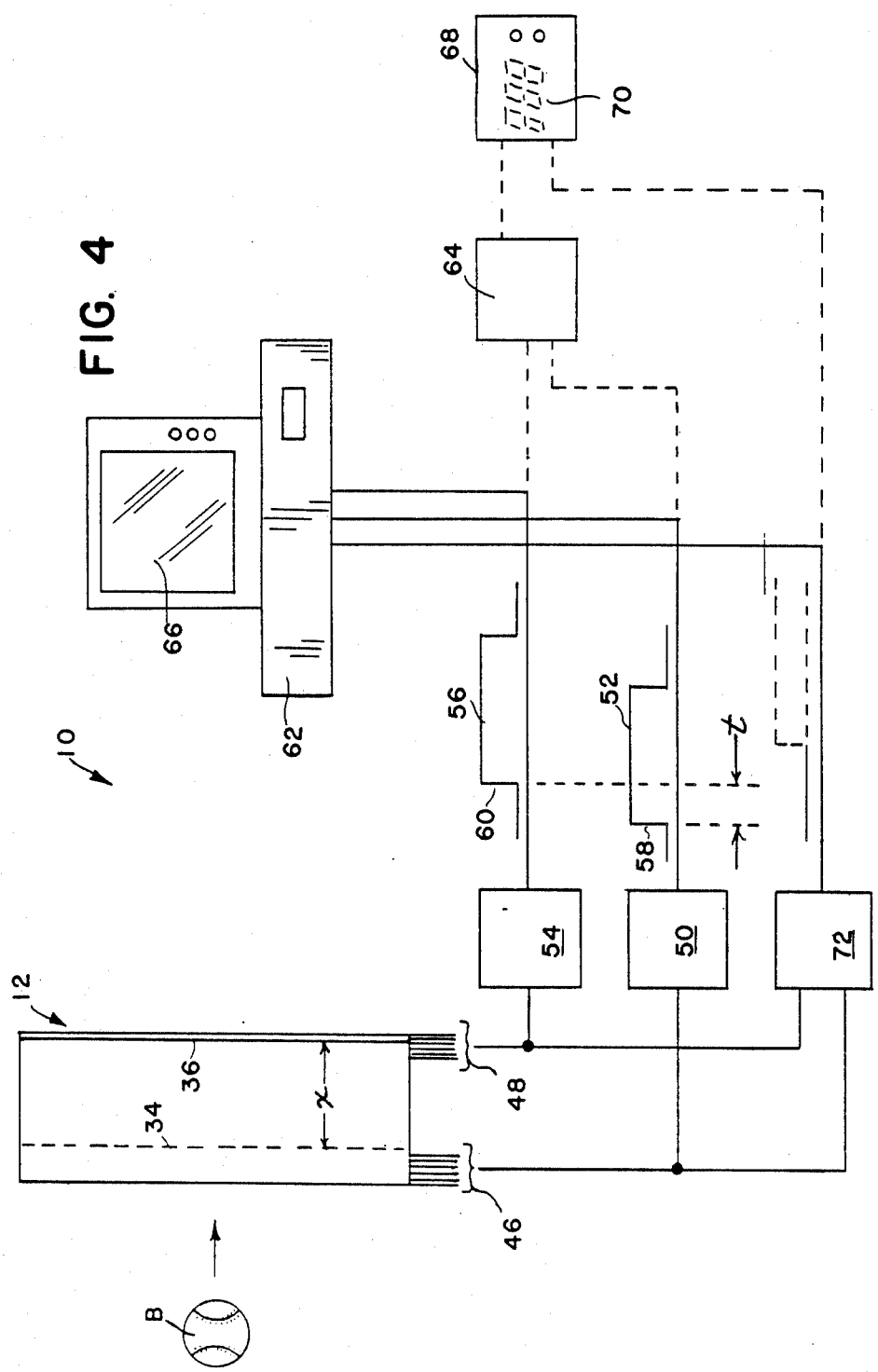
FIG. 4 is a simplified block diagram of electronic circuitry according to the invention.

Detectors 30 and 32 and transducer 36 (or individual zones of transducer 36) are provided with wire leads 46 and 48, respectively, to connect their outputs to suitable electronic processing circuitry, as shown in FIG. 4. Leads 46 from detectors 30 and 32 are connected to a first circuit 50 which senses that at least one of the light beams comprising grid 34 has been broken by a projectile and which generates a pulse 52 in response to the breaking of the light beam. Details of specific circuitry for detecting the breaking of one of the light beams and generating an output pulse in response are not disclosed, since such circuit details are well within the skill in the art.

Leads 48 from force transducer 36 (or from the various zones of force transducer 36, if it is divided into zones) are connected to a second circuit 54 which responds to the signal generated by the force transducer upon projectile impact and which generates a pulse 56 in response to the output from force transducer 36. As with first circuit 50, details of second circuit 54 are not disclosed since those details are well within the skill in the art.

As will be appreciated, leading edge 58 of pulse 52 is representative of the moment in time when one of the light beams of grid 34 is broken by a projectile. Likewise, leading edge 60 of pulse 56 is representative of the moment in time when the projectile strikes force transducer 36 or one of the zones of transducer 36. By spacing transducer 36 apart from grid 34 by a known distance x, the velocity of a projectile can be calculated by dividing the distance x by the time interval t between the leading edge 58 of pulse 52 and the leading edge 60 of pulse 56. This calculation can be made utilizing appropriate software in a programmable computer 62 or, alternatively, by a calculating circuit 64 which converts the time interval t into a velocity. Specific details of calculating circuit 64 are not disclosed, since those details are well within the skill in the art.

If velocity is calculated by a computer 62, the computer may be programed to display the calculated velocity on a CRT display or monitor 66. If a calculating circuit is used to calculate velocity, circuit 64 may be designed to drive a conventional LED or LCD display 68. Display 68 may be provided with appropriate alphanumeric indicators 70 to indicate both velocity and, where force transducer 36 is divided into zones, zone of impact.

Impact zone information is generated by a third circuit 72 to which leads 46 from detectors 30 and 32 and leads 48 from the zones of force transducer 36 are connected. The output of third circuit 72 is connected to either computer 62 or directly to display 70, and is representative of the zone struck by the projectile. As with circuits 50, 54 and 64, details of circuit 72 are not provided, since those details are within the level of skill in the art.

In addition to the circuitry shown in FIG. 4, refinements and additional processing circuitry can be provided to permit apparatus 10 to interact with a player. For example, a player can test his pitching skill by monitoring his pitching speed and delivery with monitor 66 or display 68. In addition, player A can compete against player B, with apparatus 10 keeping track of which player has a consistently higher speed or a consistent delivery. Where a computer 62 is used to process the outputs of the detectors and force transducer, computer 62 can be programmed to simulate the characteristics of famous hitters, so that the player can, in effect, pitch to famous baseball players. For example, computer 62 can be programmed to simulate a hitter who is known to consistently hit home runs on high outside pitches. If a player throws a high outside pitch, the computer will charge the player with a home run by the simulated hitter. By means of appropriate displays, such as indicator lights located behind the zones of force transducer 36, a moving target can be presented to a pitcher, who can attempt to hit the zone indicated. Computer 62 can be programmed to randomly select zones to which the player can pitch, thus testing his aim and delivery. In addition, any number of other modifications and games will suggest themselves to those skilled in the art.

Although the present invention has been described with particular reference to baseball, it should be understood that the invention is not limited to measuring the velocity or impact of a baseball. Rather, as discussed above, the present may be adapted to games such as hockey, tennis, golf or any other game which involves skill in throwing or striking a projectile and directing it toward a target or goal.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for determining the velocity of a projectile, comprising:
   (a) optical means for generating a planar array of light beams,
   (b) circuit means operatively associated with the optical means for detecting when the projectile passes through the array and generating a signal representative of the moment in time the projectile passes through the array,
   (c) continuous planar transducer means substantially coextensive with and spaced apart from the array and in the projectile path for generating a signal representative of the moment in time the projectile strikes the transducer means, and
   (d) calculating means responsive to the signal from the circuit means and the signal from the transducer means for calculating the velocity of the projectile from said signals.

2. Apparatus according to claim 1, wherein the optical means comprises a plurality of photoelectric light sources and associated photodetectors disposed on common axes defining the array.

3. Apparatus according to claim 1, further comprising display means operatively coupled to the calculating means for providing a visual display of the velocity of the projectile.

4. Apparatus according to claim 1, wherein the transducer means is divided into a plurality of distinct independent zones, each zone being adapted to generate a signal only when struck by the projectile, and further comprising second circuit means for generating a signal representative of the zone struck by the projectile.

5. Apparatus according to claim 4, further comprising display means operatively coupled to the calculating means and the second circuit means for providing a visual display of velocity of the projectile and the zone struck by the projectile.

6. Apparatus according to claim 1, wherein the continuous planar transducer means is a continuous sheet of piezoelectric material.

7. Apparatus for determining the velocity of a projectile, comprising:
   (a) optical means for generating a planar grid of substantially mutually orthogonal light beams,
   (b) circuit means operatively associated with the optical means for detecting when the projectile passes through the grid and generating a signal representative of the moment in time the projectile passes through the grid,
   (c) continuous planar transducer means substantially coextensive with and spaced apart from the grid and in the projectile path for generating a signal representative of the moment in time the projectile strikes the transducer means, and
   (d) calculating means responsive to the signal from the circuit means and the signal from the transducer means for calculating the velocity of the projectile from said signals.

8. Apparatus according to claim 7, wherein the optical means comprises a plurality of photoelectric light sources and associated photodetectors disposed common axes, the axes defining the grid lines.

9. Apparatus according to claim 7, further comprising display means operatively coupled to the calculating means for providing a visual display of the velocity of the projectile.

10. Apparatus according to claim 7, wherein the transducer means is divided into a plurality of distinct independent zones, each zone being adapted to generate a signal only when struck by the projectile, and further comprising second circuit means for generating a signal representative of the zone struck by the projectile.

11. Apparatus according to claim 10, further comprising display means operatively coupled to the calculating means and the second circuit means for providing a visual display of velocity of the projectile and the zone struck by the projectile.

12. Apparatus according to claim 7, further comprising means for causing the projectile to be propelled a substantial distance back toward its point of origin.

13. Apparatus according to claim 7, wherein the transducer means is a continuous sheet of piezoelectric material.

14. Apparatus for determining the velocity of a projectile, comprising:
(a) a plurality of photoelectric light sources and associated photodetectors disposed in an array defining a planar grid of substantially mutually orthogonal light beams,
(b) first circuit means operatively coupled to the photodetectors for generating a signal representative of the moment in time when at least one light beam is broken by a projectile passing through the grid,
(c) a continuous planar transducer means coextensive with and spaced apart from the grid for generating a signal when the projectile strikes the transducer means after passing through the grid,
(d) second circuit means responsive to the signal from the transducer means for generating a signal representative of the moment in time when the projectile strikes the transducer means, and
(e) calculating means responsive to the signal from the first circuit means and the signal from the second circuit means for calculating the velocity of the projectile as a function of the time difference between the signals.

15. Apparatus according to claim 14, wherein the calculating means comprises programmable computer means.

16. Apparatus according to claim 14, further comprising display means operatively coupled to the calculating means for providing a visual display of the velocity of the projectile.

17. Apparatus according to claim 14, wherein the transducer means is divided into a plurality of distinct independent zones, each zone being adapted to generate a signal only when struck by the projectile, and further comprising third circuit means for generating a signal representative of the zone struck by the projectile.

18. Apparatus according to claim 17, further comprising display means operatively coupled to the calculating means and the third circuit means for providing a visual display of velocity of the projectile and the zone struck by the projectile.

19. Apparatus according to claim 14, wherein the transducer means is a continuous sheet of piezoelectric material.

20. Apparatus according to claim 14, further comprising resilient means for returning the projectile a substantial distance back toward its point of origin.

21. Apparatus for determining the velocity of a projectile, comprising:
(a) a generally rectangular frame having side walls and a back wall and being substantially open on the front wall,
(b) a plurality of photoelectric light sources and associated photodetectors arranged in linear arrays in oppositely-paired side walls on substantially mutually orthogonal common axes defining a planar grid of substantially mutually orthogonal light beams,
(c) first pulse generator means operatively coupled to the photodetectors for generating a pulse, the leading edge of which is representative of the moment in time when at least one light beam is broken by a projectile passing through the grid,
(d) a continuous planar force transducer means on the back wall, coextensive with and spaced apart from the grid in the projectile path for generating a signal when the projectile strikes the force transducer means,
(e) second pulse generator means responsive to the signal from the force transducer means for generating a pulse, the leading edge of which is representative of the moment in time the projectile strikes the force transducer means,
(f) calculating means responsive to both pulses for calculating the velocity of the projectile from the time interval between the respective leading edges of the pulses, and
(g) display means for visually displaying the velocity.

22. Apparatus according to claim 21, wherein the force transducer means is a continuous sheet of piezoelectric material.

23. Apparatus according to claim 21 wherein the force transducer means is divided into a plurality of distinct independent zones each adapted to generate a signal only when struck by the projectile, and further comprising circuit means for generating a signal representative of the zone struck by the projectile.

24. Apparatus according to claim 23, wherein the display means is adapted to visually display the zone struck by the projectile.

25. Apparatus according to claim 21, wherein the force transducer means is mounted on resilient means for returning the projectile a substantial distance back toward its point of origin.

26. Apparatus for determining the velocity of a projectile, comprising:
(a) a generally rectangular frame having side walls and a back wall and being substantially open on the front wall,
(b) a plurality of photoelectric light sources and associated photodetectors arranged in linear arrays in oppositely-paired side walls on substantially mutually orthogonal common axes defining a planar grid of substantially mutually orthogonal light beams,
(c) first pulse generator means operatively coupled to the photodetectors for generating a pulse, the leading edge of which is representative of the moment in time when at least one light beam is broken by a projectile passing through the grid,
(d) a continuous planar sheet of piezoelectric material on the back wall, coextensive with and spaced apart from the grid in the projectile path for generating a signal when the projectile strikes the piezoelectric material, (e) second pulse generator means responsive to the signal from the piezoelectric material for generating a pulse, the leading edge of which is representative of the moment in time the projectile strikes the piezoelectric material, (f) calculating means responsive to both pulses for calculating the velocity of the projectile from the time interval between the respective leading edges of the pulses, and (g) display means for visually displaying the velocity.

27. Apparatus according to claim 26 wherein the piezoelectric material is divided into a plurality of distinct independent zones each adapted to generate a signal only when struck by the projectile, and further comprising circuit means for generating a signal representative of the zone struck by the projectile.

28. Apparatus according to claim 27, wherein the display means is adapted to visually display the zone struck by the projectile.

29. Apparatus according to claim 26, wherein the piezoelectric material is mounted on a continuous sheet of resilient material for returning the projectile a substantial distance back toward its point of origin.

30. In an apparatus for detecting impact of a projectile, a piezoelectric force transducer for generating a pulse in response to impact of a projectile, comprising a continuous planar sheet of a piezoelectric polymer material arranged to be struck directly by the projectile and having a surface area substantially greater than the area impacted by the projectile.

31. In an apparatus according to claim 30, wherein the piezoelectric polymer material comprises polyvinylidine fluoride.

* * * * *